(12) United States Patent
Kanazawa

(10) Patent No.: US 7,580,685 B2
(45) Date of Patent: Aug. 25, 2009

(54) RADIO COMMUNICATION SYSTEM

(75) Inventor: Masayuki Kanazawa, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 474 days.

(21) Appl. No.: 11/176,291

(22) Filed: Jul. 8, 2005

(65) Prior Publication Data

US 2006/0009254 A1    Jan. 12, 2006

(30) Foreign Application Priority Data

Jul. 9, 2004    (JP)    ............... 2004-202921

(51) Int. Cl.
 H04B 1/38    (2006.01)
 H04M 1/00   (2006.01)
 H04N 7/14   (2006.01)
(52) U.S. Cl. ............... 455/90.1; 455/90.2; 455/569.1; 379/388.01; 379/388.02; 379/420.01; 348/14.02
(58) Field of Classification Search ............. 455/550.1, 455/569.1, 569.2, 90.2, 90.1; 379/157–158, 379/202.01, 205.01, 420.01–420.04, 434, 379/388.01, 388.02, 390.01; 348/14.01, 348/14.02
See application file for complete search history.

(56) References Cited

U.S. PATENT DOCUMENTS

| | | | | |
|---|---|---|---|---|
| 4,491,699 | A * | 1/1985 | Walker | 379/174 |
| 5,640,459 | A * | 6/1997 | Hedeen | 381/75 |
| 6,744,927 | B1 | 6/2004 | Kato | |
| 2003/0232626 | A1 * | 12/2003 | Hill et al. | 455/519 |
| 2004/0127233 | A1 * | 7/2004 | Harris et al. | 455/458 |
| 2004/0213474 | A1 * | 10/2004 | Kato | 382/239 |
| 2004/0228292 | A1 * | 11/2004 | Edwards | 370/277 |
| 2005/0136848 | A1 * | 6/2005 | Murray | 455/79 |
| 2005/0233776 | A1 * | 10/2005 | Allen et al. | 455/567 |

FOREIGN PATENT DOCUMENTS

| | | |
|---|---|---|
| JP | 5-153015 | 6/1993 |
| JP | 7-336264 | 12/1995 |
| JP | 8-34499 | 3/1996 |

(Continued)

OTHER PUBLICATIONS

"Airport Digital Mobile Telecommunication System", ARIB STD T-87, Oct. 2003, Association of Radio Industries and Business of Japan.

Primary Examiner—George Eng
Assistant Examiner—Nam Huynh
(74) Attorney, Agent, or Firm—Brundidge & Stanger, P.C.

(57) ABSTRACT

A radio communication system having a plurality of mobile stations, at least one base station, and a control side apparatus connected to the base station. Each mobile station has a mode switching instruction reception unit for receiving an instruction for switching from a radio communication mode for performing a radio communication operation to a loudspeaker mode or a hot mic mode, a destination identifying information storage unit for storing information for identifying a communication apparatus which serves as a communication partner when the mode switching instruction reception unit receives the instruction for switching to the hot mic mode, and a destination identifying information transmission unit responsive to the received instruction for switching to the hot mic mode by the mode switching instruction reception unit for transmitting the information stored in the destination identifying information storage unit over the air.

1 Claim, 13 Drawing Sheets

FOREIGN PATENT DOCUMENTS

| | | |
|---|---|---|
| JP | 2000-244631 | 9/2000 |
| JP | 2002 101166 | 4/2002 |
| JP | 2003 174676 | 6/2003 |
| JP | 2004 072499 | 3/2004 |
| JP | 2005 020435 | 1/2005 |

* cited by examiner

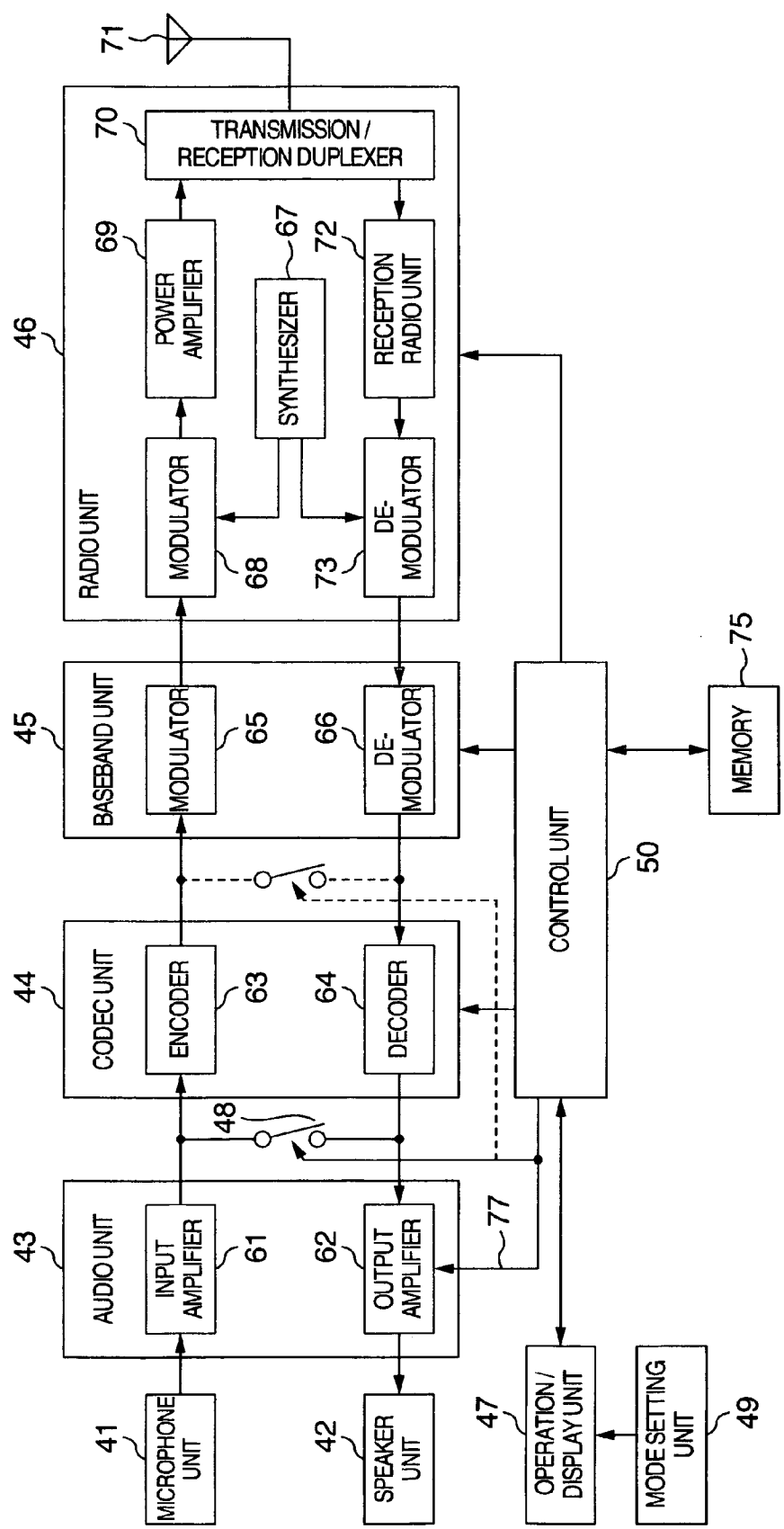

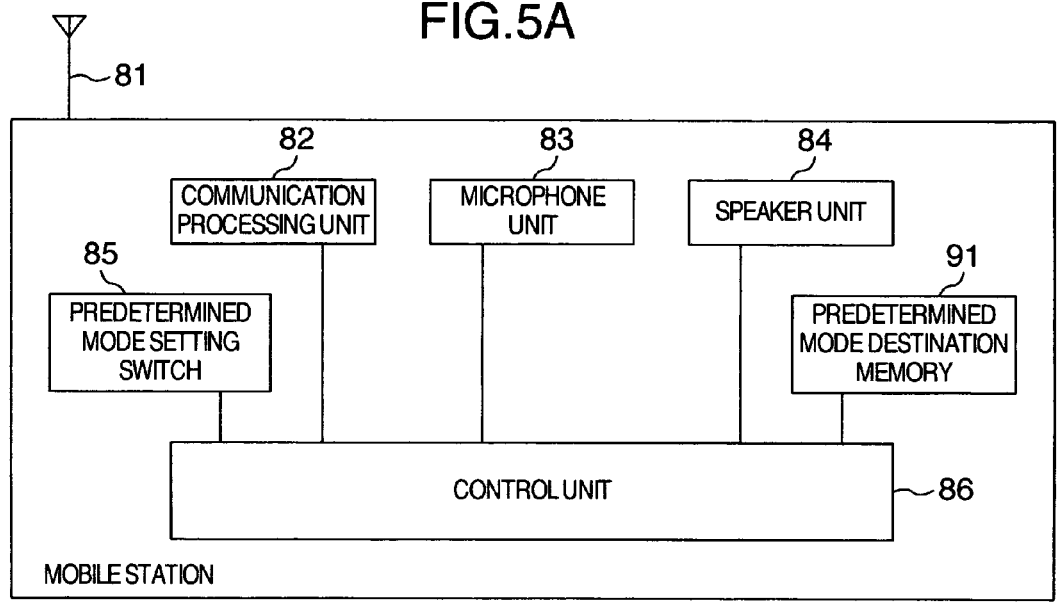

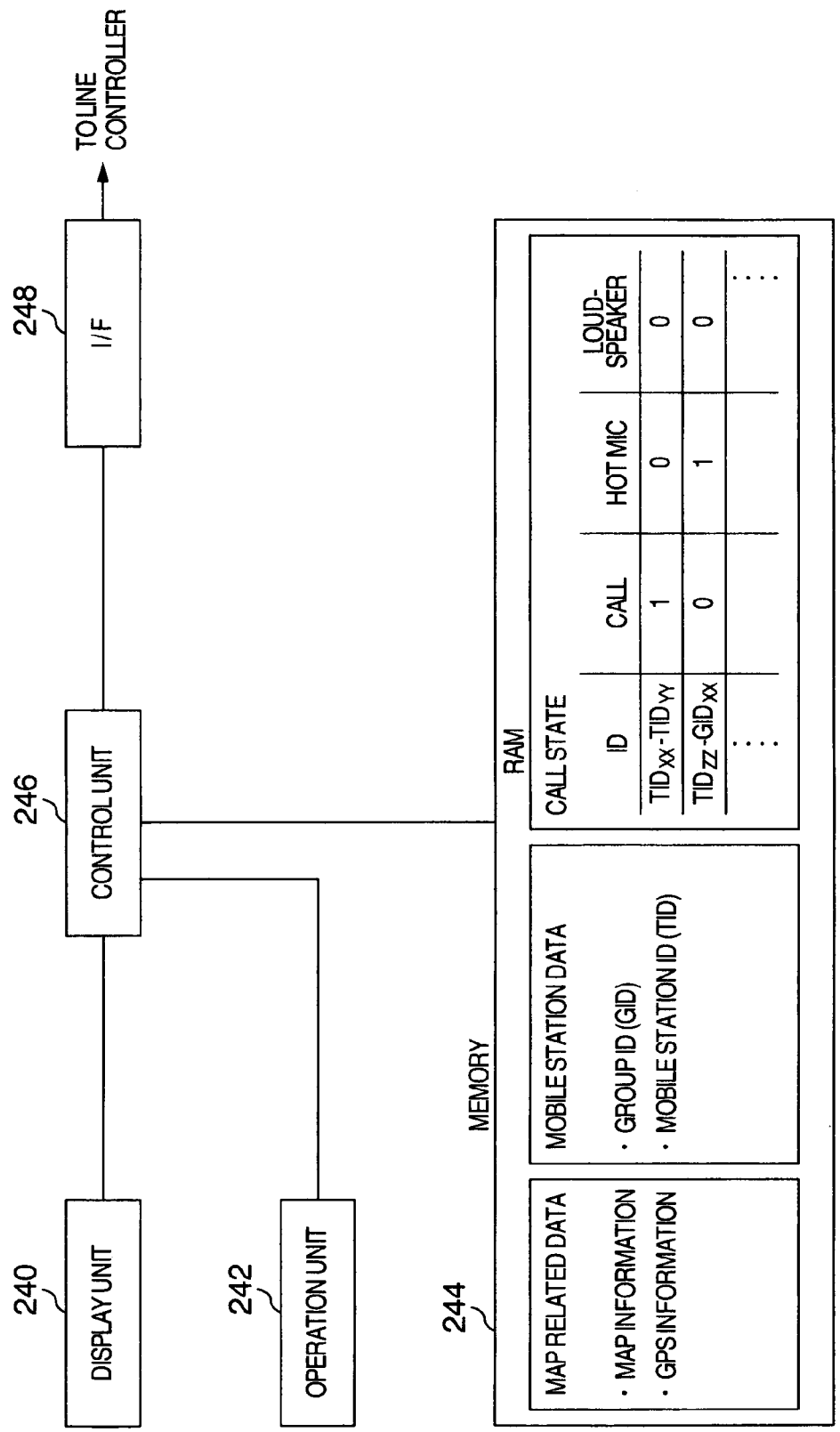

FIG.10

| AIRLINE COMPANY A (ID : 00) | | AIRLINE COMPANY B (ID : 01) | | AIRLINE COMPANY C (ID : 02) | |
|---|---|---|---|---|---|
| PILOTS | 00-111-2345<br>00-111-4567<br>00-111-XXXX<br>.... | PILOTS | 01-111-XXXX<br>.... | PILOTS | 02-111-XXXX<br>.... |
| FLIGHT ATTENDANTS | 00-112-XXXX<br>.... | FLIGHT ATTENDANTS | 01-112-XXXX<br>.... | FLIGHT ATTENDANTS | 02-112-XXXX<br>.... |
| GROUND CREWS | 00-113-XXXX<br>.... | GROUND CREWS | 01-113-XXXX<br>.... | GROUND CREWS | 02-113-XXXX<br>.... |

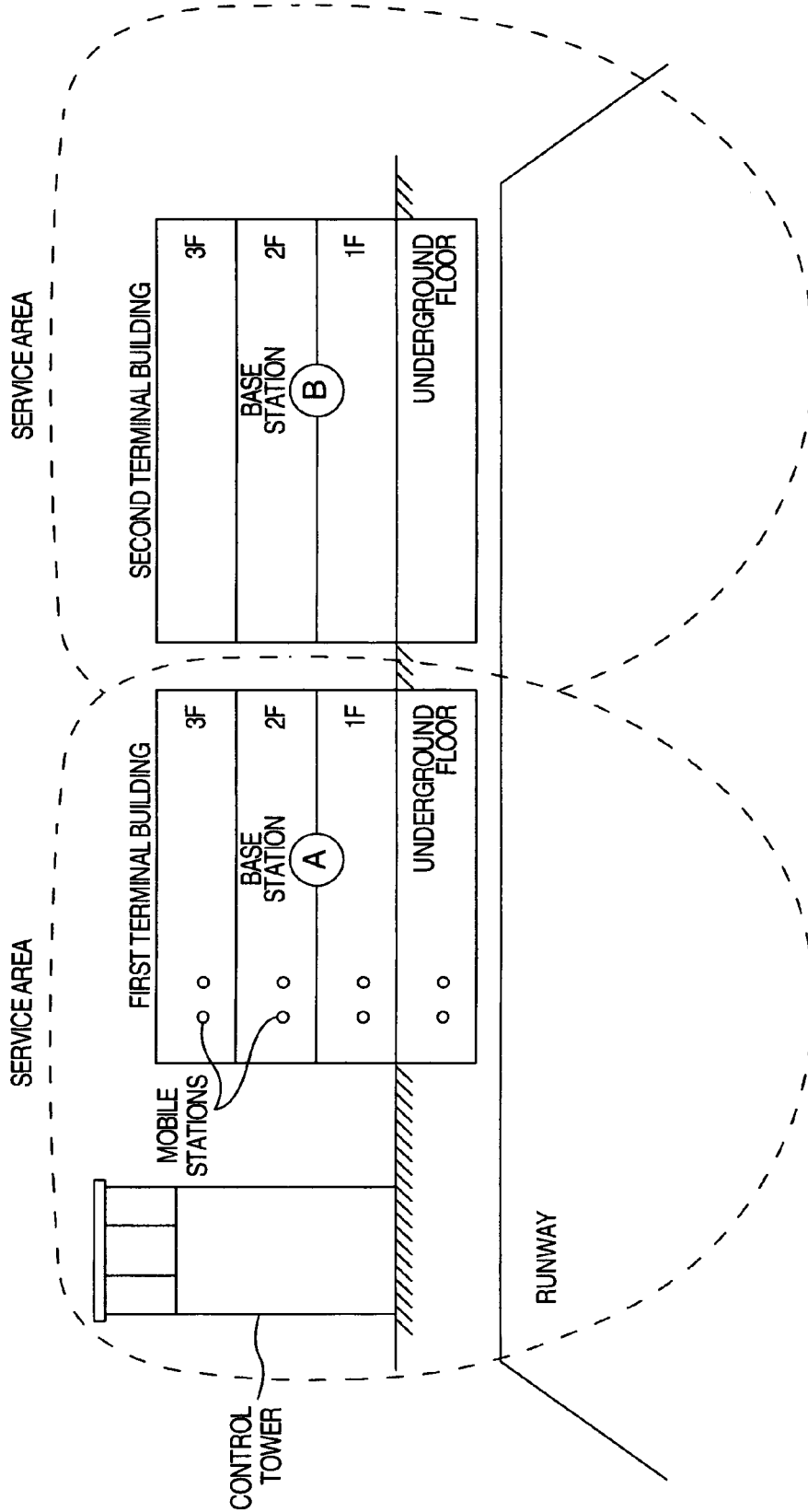

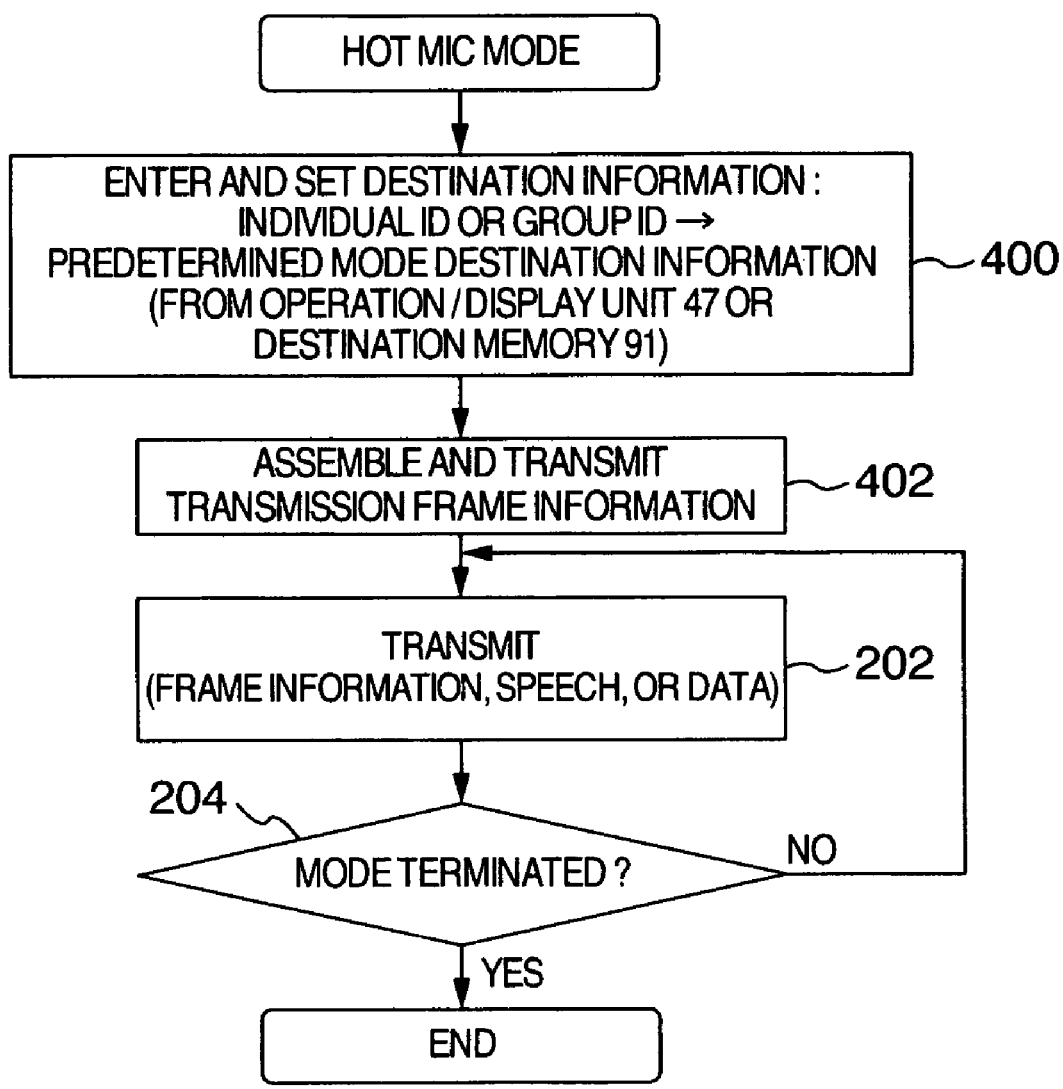

RADIO COMMUNICATION SYSTEM

INCORPORATION BY REFERENCE

The present application claims priority from Japanese application JP 2004-202921 filed on Jul. 9, 2004, the content of which is hereby incorporated by reference into this application.

BACKGROUND OF THE INVENTION

The present invention relates to a radio communication system which includes a mobile station and a base station that communicate with each other over the air, and more particularly, to a radio communication system which improves the usability of a mobile station in an airport and the like.

A standard has been established for a multi-channel access (MCA) radio system for airports which plays an important role of ensuring the security of aircraft existing in airports and the comfort of users. For example, see a document entitled "AIRPORT DIGITAL MOBILE TELECOMMUNICATION SYSTEM," ARIB STD T-87, October 2003 by Association of Radio Industries and Business (ARIB).

In a system conforming to the foregoing standard, an airport, which constitutes a basic unit, is composed of control station facilities, base station facilities, and mobile station facilities, wherein communications are made between a domestic terminal and a mobile station or between mobile stations (through a base station or directly) using a 400 MHz band. The system employs a quadruple TDM/TDMA scheme which separates a single radio carrier on a frame-by-frame basis and groups the frames into four slots for providing multiple channels. The system also employs a $\pi/4$ shifted QPSK modulation scheme. Specifically, a base station is assigned a single or a plurality of radio carriers (pair waves) from a 400 MHz band which is an available frequency band. Each of a downlink radio carrier f1 and an uplink radio carrier f2 is divided into frames which are sub-divided into slots which are then allocated to a control channel and a communication channel.

For special requirements of operational communications within an airport such as consistent security for aircraft, this system permits ensured emergency communications, preferential connections for crucial or important communications, and transmission function (hot mic function) for mobile stations. The foregoing standard also permits non-speech communications such as character communications, image transmissions, and the like through data communications, simultaneous speech and data communications, and the like in addition to speech communications. The hot mic function is also called a "hot mic remote monitor function" which allows the user to transmit a speech from a mobile station without pushing a PTT button (press-to-talk button). As the user pushes the PTT button down to enter a hot mic mode, the mobile station collects sound therearound which is transmitted to a destination mobile station connected thereto. Once in the hot mic mode, the destination mobile station is automatically limited to a reception function.

JP-A-2000-244631, for example, discloses an exemplary configuration of a conventional mobile station which makes digital mobile radio communications. This mobile station comprises a transmission/reception switching unit, a receiver, a demodulator, a codec, a speech processing unit, ear speakers, a microphone, a modulator, a transmitter, and a controller. Also, an operation panel and a display unit are connected to the controller. A loudspeaker is also connected to the controller, so that when the loudspeaker is drawn out of the mobile station, a speech of a communicating partner (the party on the other end) is switched from the ear speakers to the loudspeaker for emitting the speech at a higher volume, thus permitting the user to speak while viewing a screen.

SUMMARY OF THE INVENTION

However, the conventional mobile station as described above is still insufficient in the usability and the like, so that further developments have been requested in this respect. Particularly, there has been a desire to improve the usability of mobile stations in places such as airports to which an indefinite number of persons flock.

The present invention has been made in view of the conventional situation as described above, and it is an object of the invention to provide a mobile station, a radio communication system, and a radio communication method which can improve the usability of the mobile station in an airport and the like.

To achieve the above object, a radio communication system according to one aspect of the present invention has:
 a plurality of mobile stations;
 at least one base station; and
 a control apparatus (control side apparatus) connected to the base station,
 wherein each of the mobile stations includes:
 a mode switching instruction reception unit for receiving an instruction for switching from a radio communication mode for performing a radio communication operation to a predetermined mode for performing a different predetermined operation; and
 a mode switching information transmission unit responsive to the instruction for switching to a predetermined mode received by the mode switching instruction reception unit for transmitting information indicating that the instruction has been received over the air.

A mobile station according to another aspect of the present invention includes:
 a mode switching instruction reception unit for receiving an instruction for switching from a radio communication mode for performing a radio communication operation to a predetermined mode for performing a different predetermined operation;
 a destination identifying information storage unit for storing a communication apparatus which serves as a destination when the mode switching instruction reception unit receives the instruction for switching to a predetermined mode; and
 a destination identifying information transmission unit responsive to the instruction for switching to a predetermined mode received by the mode switching instruction reception unit for transmitting the information stored in the destination identifying information storage unit over the air.

Preferably, in the mobile station described above, the predetermined mode is a loudspeaker mode for performing a loudspeaker operation or a hot mic mode for performing a hot mic operation, the destination identifying information storage unit stores at least one of information for identifying a communication apparatus which is notified, when an instruction for switching to the loudspeaker mode is received, of information indicating to that effect, information for identifying a communication apparatus which is notified, when an instruction for switching to the hot mic mode is received, of information indicating to that effect, and information for identifying a communication apparatus which is to be a partner that is continuously connected to the mobile station when the instruction for switching to the hot mic mode is received, and the destination identifying information transmission unit transmits over the air destination identifying information corresponding to a mode indicated in a switching instruction received by the mode switching instruction reception unit.

Also preferably, in the mobile station described above, the predetermined mode includes a hot mic mode, the destination identifying information storage unit has been previously registered with information for identifying a plurality of mobile stations previously selected as destinations in the hot mic mode as a destination group, and the destination identifying information transmission unit is responsive to a start of the hot mic mode for transmitting the destination group to an associated base station, wherein the mobile station may or may not belong to the destination group.

Preferably, in the radio communication system described above, the predetermined mode includes a hot mic mode for performing a hot mic operation, and the control side apparatus includes an apparatus for adding a group of arbitrary destination mobile stations to a group of mobile stations previously selected as destinations in the hot mic mode to specify the resulting group to an associated base station as destinations in the hot mic mode.

Also preferably, in the radio communication system described above, the added group of arbitrary destination mobile stations includes a mobile station which is selected using a global positioning system (GPS) and is placed in a predetermined positional relationship with the position of the mobile station which is set in the hot mic mode.

Further preferably, in the radio communication system described above, the base station or the control side apparatus includes a mode switching notification unit for receiving mode switching information transmitted from the mode switching information transmission unit, and notifying a destination mobile station of the receipt of the mode switching information.

Further preferably, the radio communication system described above further includes a plurality of imaging apparatuses for imaging regions different from one another, a display apparatus for displaying images from the imaging apparatus on the same screen, and an image control unit responsive to received mode switching information for displaying an image from an imaging apparatus which is imaging a region which includes a mobile station which has transmitted the mode switching information, where the image is displayed on the screen in a manner distinguishable from images from the remaining imaging apparatus.

A mobile station according to another aspect of the present invention includes:

a speech input unit for receiving a speech;

an external image collecting apparatus;

an image data input unit for receiving image data from the external image collecting apparatus;

a radio communication processing unit for making a radio communication using an antenna;

a mode switching instruction reception unit for receiving an instruction for switching from a radio communication mode for performing a radio communication operation to a hot mic mode for performing a hot mic operation from the radio communication processing unit; and a hot mic operation unit responsive to the instruction for switching to the hot mic mode received by the mode switching instruction reception unit for making a connection to another communication apparatus to continuously transmit a speech signal inputted from the speech input unit to the other communication apparatus through the radio communication processing unit, and to continuously transmit image data inputted by the image data input unit to the other communication apparatus through the radio communication processing unit.

A communication method executed by a mobile station, according to another aspect of the present invention, includes the steps of:

receiving an instruction for switching from a radio communication mode for performing a radio communication operation to a predetermined mode for performing another predetermined operation;

in response to the received instruction for switching to a predetermined mode, retrieving information for identifying a destination communication apparatus from a destination identifying information storage unit of the mobile station;

transmitting the retrieved identifying information to an associated base station; and transmitting data to be communicated.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram illustrating the configuration of a mobile station according to another embodiment of the present invention;

FIG. 5A is a block diagram illustrating an exemplary configuration of a mobile station according to a further embodiment of the present invention;

FIG. 5B is a diagram showing an example of information included in a transmission radio signal;

FIG. 6 is a block diagram illustrating an exemplary configuration of an operation control apparatus in the system of FIG. 1;

FIG. 10 is a diagram for describing how mobile stations are grouped;

FIG. 11 is a schematic diagram illustrating an exemplary layout of an airport which is equipped with the radio communication system;

FIG. 12 is a flow chart for describing a sequence of operations performed by the mobile station in the hot mic mode according to another embodiment;

DESCRIPTION OF THE EMBODIMENTS

Figure 1:
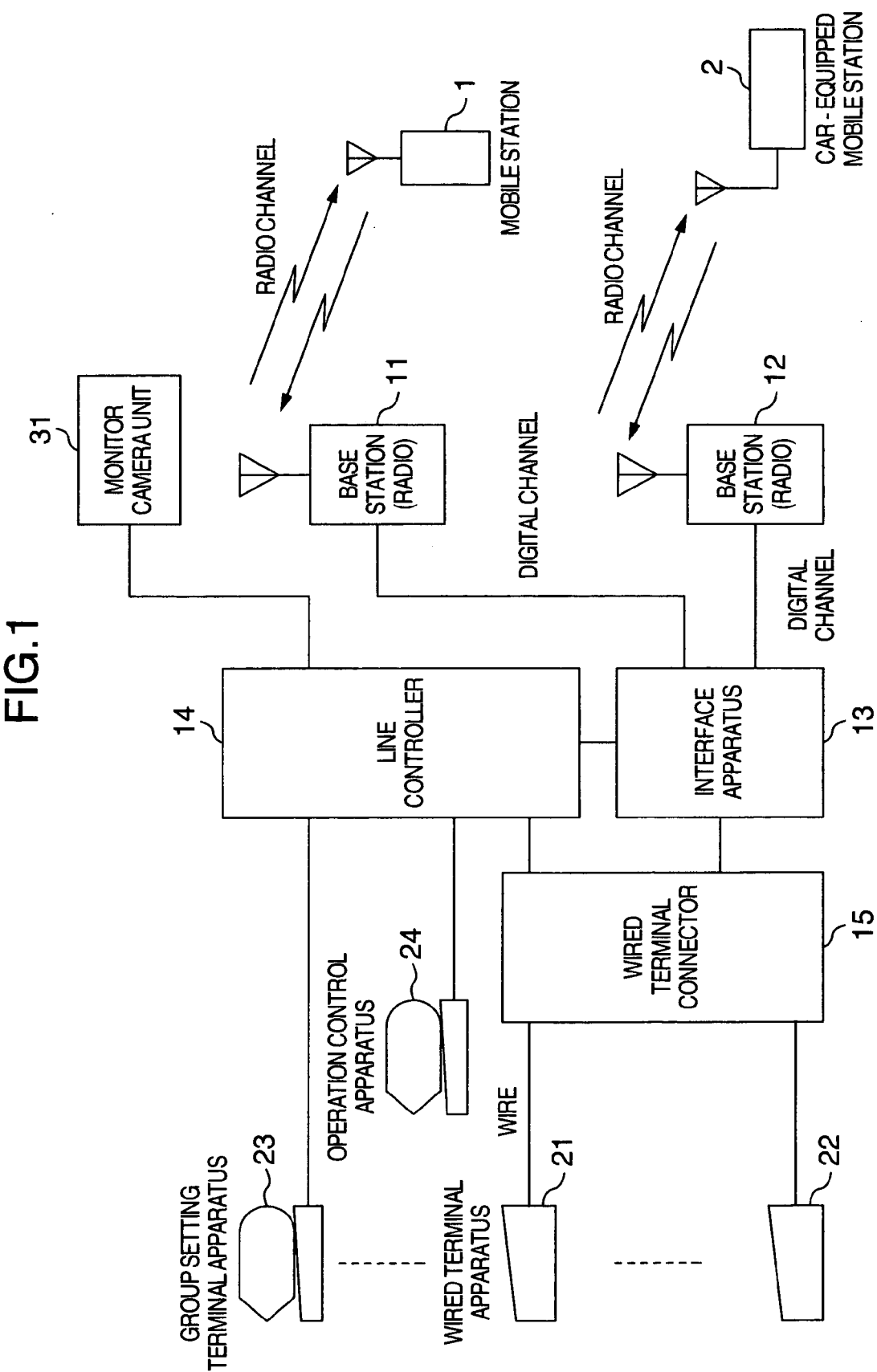
FIG. 1 is a block diagram illustrating an exemplary configuration of an airport digital mobile communication system according to one embodiment of the present invention.

Several embodiments according to the present invention will be described with reference to the accompanying drawings, where like members are designated like reference numerals.

FIG. 1 illustrates an exemplary configuration of an airport digital mobile communication system according to one embodiment of the present invention.

This airport digital mobile communication system comprises a mobile station 1, car-equipped mobile station 2, a plurality of base stations (radio apparatuses) 11, 12, an interface apparatus 13, a line controller 14, a wired terminal connector 15, a plurality of wired terminal apparatuses 21, 22, a group setting terminal apparatus 23, an operation control apparatus 24, and a monitor camera unit 31.

Here, the base stations 11, 12 are connected to the interface apparatus 13. The interface apparatus 13, line controller 14, and wired terminal connector 15 are connected to one another. The plurality of wired terminal apparatuses 21, 22 are connected to the wired terminal connector 15, and the group setting terminal apparatus 23, operation control apparatus 24, and monitor camera unit 31 are connected to the line controller 14.

It should be understood that the system is not limited to the illustrated configuration, but a variety of configurations may be used instead. For example, the system may comprise any number of mobile stations 1, 2 and any number of base stations 11, 12.

Now, a description will be given of an exemplary sequence of general operations performed in the airport digital mobile communication system.

Each of the base stations 11, 12 manages or controls the mobile stations 1, 2 existing in its coverage area (service area), and makes communications with the mobile stations 1, 2 over the air.

Each of the base stations 11, 12 makes communications with the line controller 14 and wired terminal connector 15 through the interface apparatus 13.

Each of the wired terminal apparatuses 21, 22 makes communications with the line controller 14 and the like through the wired terminal connector 15.

A main function of the group setting terminal apparatus 23 is to set a terminal ID to each mobile station and an ID to a group to which the mobile station belongs. Though not limited, the group setting terminal apparatus 23 is configured, for example, to be removable from and operable independently of the line controller 14. When a mobile station to be set is, for example, a car equipped type, the group setting terminal apparatus 23 is conveniently moved to the vehicle and is electrically coupled to the mobile station within the car to make necessary settings. After the setting, set contents are passed to the operation control apparatus 24 through the line controller 14 by again connecting the group setting terminal apparatus 23 to the line controller 14. The set contents may include arbitrary items, not limited to the terminal ID and group ID, such as an item indicating that the mobile station is dedicated to a group manager.

The operation control apparatus 24, which is installed, for example, in a control (management) center, makes a variety of managements and controls in the operation of the system.

The monitor camera unit 31 captures an image of a predetermined site, and transmits the captured image to the operation control apparatus 24 and the like.

In the airport digital mobile communication system according to this embodiment, all airport workers such as pilots of aircraft, other flight attendants, ground crew, clerks, and the like possess mobile stations (for example, the mobile station 1), and all vehicles such as cars used for operations in the airport are equipped with mobile stations (for example, the mobile station 2). Thus, a call can be placed between arbitrary workers, for example, between a manager present in the control center and an external worker through the mobile stations.

Also, the airport digital mobile communication system classifies, for example, the pilots of aircraft, other flight attendants, ground crew, and clerks into arbitrary groups (grouping). This grouping permits a simultaneous delivery or broadcast from a higher rank apparatus to all mobile stations belonging to a specified arbitrary group, and a simultaneous delivery or broadcast from a normal or ordinary mobile station to all the mobile stations belonging to the specified group. The operation control apparatus 24 is responsible for setting and control (management) of such grouping. The configuration of the operation control apparatus 24 will be described below with reference to FIG. 6.

FIG. 6 illustrates an exemplary configuration of the operation control apparatus 24. As illustrated, the operation control apparatus 24 comprises a display unit 240, an operation panel 242, and a memory 244 connected to a control unit 246, such that grouping data set through the operation panel 242 is passed to the line controller 14 through an interface 248. The memory 244 stores map-related data comprised, for example, of map information on a geographic area for each of base stations or including all base stations, GPS (Global Positioning System) information (ID, location, and the like of each mobile station), and the like. The memory 244 also stores mobile station data. The mobile station data is composed of the group ID of mobile stations (hereinafter called "GID" for convenience), and the ID of each mobile station (called "TID" for convenience), and stores, for example, the group ID of each group in correspondence with the IDs of mobile stations which belong to the group. A communication state is managed in a RAM of the memory 244. In the illustrated example, a status flag is currently set to "1" for $TID_{XX}$ and $TID_{YY}$, indicating that a call is under way between these mobile stations. Also, the states flag is set to "1" for $TID_{ZZ}$ and $GID_{XX}$, indicating a call under way in the hot mic mode. The status flag is also used to indicate whether or not a certain mobile station is in the loudspeaker mode. The display unit 240, controlled by the control unit 246, displays images from a plurality of monitor camera units 31 on the same screen in a split view, for example, as described below in connection with FIG. 4. The display unit 240 also displays contents of the memory 244 as required, is responsive to a connection request from a mobile station through a base station to display the ID of the mobile station and the ID of the destination, and displays a GUI screen for use in extending destinations, later described. The extension (expansion) of destinations is not limited to the GUI screen but, may be implemented in an arbitrary manner such as by providing the operation control apparatus 24 with a selection button for an extension group. In addition to the foregoing data, the memory 244 can also store a variety of information such as a sector configuration of the base stations required for the operation of the mobile communication system.

According to the airport digital mobile communication system, the locations at which the respective mobile stations 1, 2 exist can be identified using the map related data, GPS, the sector configuration of the base stations and the like stored in the operation control apparatus 24.

Another embodiment of the present invention will be described.

FIG. 2 illustrates an exemplary configuration of a mobile station (for example, the mobile stations 1, 2 shown in FIG. 1) for making digital mobile radio communications according to a second embodiment of the present invention.

This mobile station comprises a microphone unit 41 having a microphone (acousto-electric transducer); a speaker unit 42 having a speaker (electro-acoustic transducer); an audio unit 43; a codec unit 44; a baseband unit 45; a radio unit 46; an operation/display unit 47; a switch 48; a mode setting unit 49; and a control unit 50. The audio unit 43 in turn has an input amplifier 61 and an output amplifier 62; the codec unit 44 has an encoder 63 and a decoder 64; the baseband unit 45 has a modulator 65 and demodulator 66; and the radio unit 46 has a synthesizer 67, a demodulator 68, a power amplifier 69, a transmission/reception duplexer (switching circuit or multi-coupler) 70, an antenna 71, a reception radio unit 72, and a demodulator 73.

The control unit 50 is connected to the audio unit 43, codec unit 44, baseband unit 45, radio unit 46, operation/display unit 47, and switch 48, and has a function of controlling (managing) the operations of these components. Also, a signal line 77 of the control unit 50 supplies the output amplifier 62 with a gain switching signal, which indicates an increase in the amplification gain of the output amplifier 62, in the loudspeaker mode. While the switch 48 is shown to be inserted between the output of the input amplifier 61 and the input of the output amplifier 62, the switch 48 may be inserted instead between the output of the encoder 44 and the input of the decoder 64, as indicated by a broken line.

In this embodiment, the control unit 50 has a function of managing the control associated with the man-machine interface of the operation/display unit 47.

A memory 75 connected to the control unit 50 stores a variety of information required for the operation of the mobile station. For example, part of the memory 75 is allocated for storing information for identifying a destination. For example, upon receipt of an instruction to switch to the loudspeaker mode, the memory 75 stores information for identifying a communication apparatus which should be notified of information indicative of the instruction. Upon receipt of an instruction to switch to the hot mic mode, the memory stores information for identifying a communication apparatus which should be notified of information indicative of the instruction, and information for identifying a communication apparatus which is to be continuously connected to serve as a communication partner upon receipt of an instruction to switch to the hot mic mode as required. Alternatively, such information may be set in the base station.

Now, a description will be given of exemplary sequences of operations performed by the mobile station.

First described is an exemplary sequence of operations involved in a transmission performed by the mobile station.

When a speech signal is transmitted as a radio signal, the speech signal outputted from the microphone unit 41 is amplified by the input amplifier 61 of the audio unit 43, and then applied to the encoder 63 of the codec unit 44 which encodes the speech signal as well as performs encoding processing associated with the channel codec on the speech signal. The resulting encoded speech signal is modulated by the modulator 65 in the baseband unit 45 in accordance with a predetermined modulation scheme for conversion into a transmission baseband signal which is then applied to the modulator 68 of the radio unit 46. The modulator 68 receives a carrier wave outputted from the synthesizer unit 67, up-converts the input signal from the modulator 65 with the carrier wave to a signal at a predetermined radio frequency, and delivers the resulting radio frequency signal. Subsequently, the radio frequency signal is amplified by the power amplifier 69 to predetermined transmission power, and transmitted from the antenna 71 over the air via the duplexer 70.

Next described is an exemplary sequence of operations involved in a reception performed by the mobile station.

For receiving a radio signal to output a speech, a radio frequency signal received through the antenna 71 is applied to the reception radio unit 72 through the transmission/reception duplexer 70 of the radio unit 46 for amplification. The resulting amplified signal is applied to the demodulator 73. The modulator 73 receives a carrier wave outputted from the synthesizer 67, and down-converts the input signal from the reception radio unit 72 for conversion into a received baseband signal. The received baseband signal is applied to the demodulator 66 of the baseband unit 45 which demodulates the received baseband signal in accordance with a predetermined demodulation scheme to restore a received signal. Subsequently, the received signal is decoded by the decoder 64 of the codec unit 44 and also undergoes decoding processing associated with the channel codec to generate a speech signal. This speech signal is applied to the speaker unit 42 through the output amplifier 62 of the audio unit 43, and eventually a speech corresponding to the speech signal is outputted from the speaker unit 42.

Next described is an exemplary sequence of operations involved in testing of the audio unit 43, performed by the mobile station of this embodiment.

The mobile station of this embodiment is provided with the switch 48 disposed between the audio unit 43 and the codec unit 44 for looping back a signal in order to conduct an operation test on the audio unit 43 in a manufacturing factory.

During the operation test of the audio unit 43, the control unit 50 turns the switch 48 on such that the input amplifier 61 is connected to the output amplifier 62 through the switch 48. As a test signal is inputted from the microphone unit 41, the input signal is looped back such that it is outputted from the speaker unit 42 through a path including the input amplifier 43, switch 48, and output amplifier 62.

During the test, a signal generator which outputs, for example, a single tone signal having a defined level is connected to the microphone unit 41 to apply the signal outputted from the signal generator to the input amplifier 61 of the audio unit 43 as a test signal. The test signal is looped back through the switch 48 and output amplifier 62, and delivered to the speaker unit 42. The level of the signal delivered to the speaker unit 42 is evaluated using a level meter to determine whether the audio unit 43 passes or fails. When the switch 48 is disposed between the codec unit 44 and the baseband unit 45 (i.e., between the output of the encoder 44 and the input of the decoder 64), a determination is made on whether the audio unit 43, including the codec unit 44, passes or fails.

Next described is an exemplary sequence of operations performed by the mobile station in the loudspeaker mode.

The mobile station has a radio communication mode (hereinafter called the "normal mode") for performing normal radio communication operations, for example, the aforementioned transmission and reception, and the loudspeaker mode for performing operations as a loudspeaker.

The mode setting unit 49 comprises keys, buttons and the like manipulated, for example, by the user of the mobile station of this embodiment. The user can specify an arbitrary mode through operations on the mode setting unit 49 which outputs information indicative of the specified mode (mode information) to the control unit 50 through the manipulation/display unit 47.

The user sets the normal mode for using the mobile station in normal radio communication operations, whereas the user sets the loudspeaker mode for using the mobile station in loudspeaker operations.

Here, when the normal mode is set, the control unit 50 turns the switch 48 off to connect the input amplifier 61 of the audio unit to the encoder 63 of the codec unit 44, rather than to the output amplifier 62, and to connect the output amplifier 62 to the decoder 64 of the codec unit 44.

The operation/display unit 47 comprises an operation panel having keys, buttons and the like manipulated by the user, and a display unit for displaying information on the screen for the user. For example, the mode setting unit 49 may be separated from the operation/display unit 47 or integrated with the operation/display unit 47.

Figure 7A:
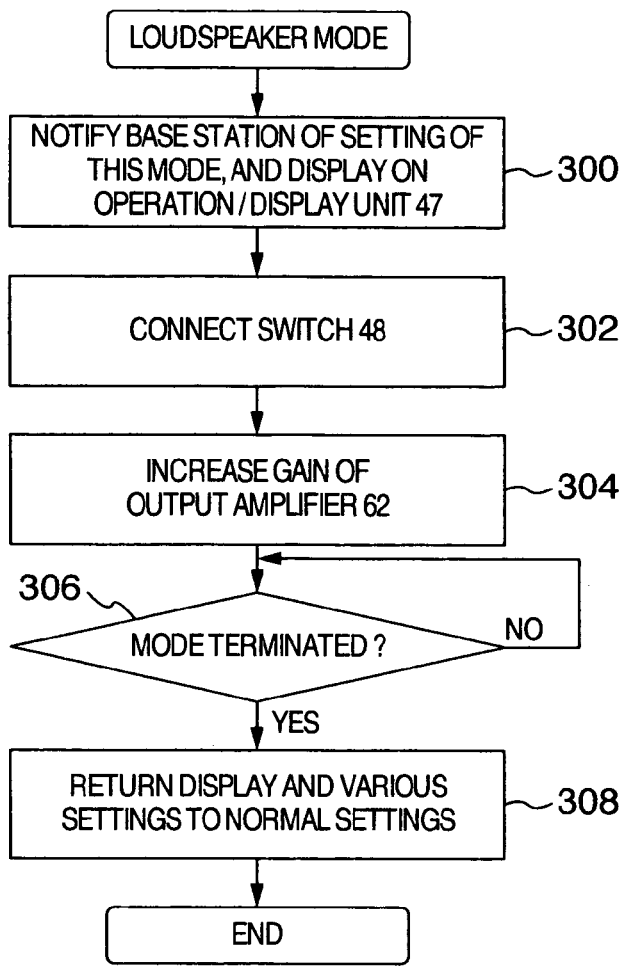
FIG. 7A is a flow chart for describing a process performed by the mobile station in a loudspeaker mode according to one embodiment.
Figure 7B:
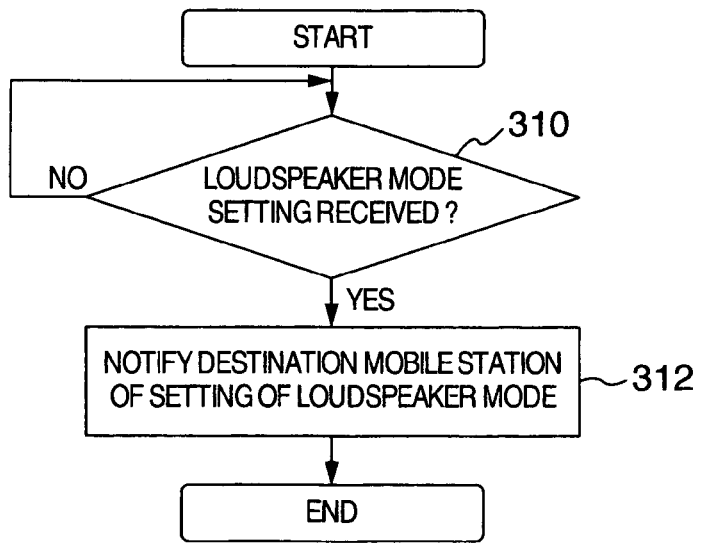
FIG. 7B is a flow chart illustrating a sequence of operations performed by the operation control apparatus in the loudspeaker mode.

Referring to FIG. 7A which illustrates a flow chart of a sequence of operations in the loudspeaker mode, a description will be given of the operation of the control unit 50 in the loudspeaker mode. FIG. 7B is a flow chart generally illustrating a sequence of operations performed by the operation control apparatus 24 in the loudspeaker mode.

As the user operates on the mode setting unit 49 to set the loudspeaker mode, the control unit 50 receives mode information which indicates that the loudspeaker mode has been specified. In response, the control unit 50 first displays a symbol or a character string indicative of the loudspeaker mode on the operation/display unit 47, and notifies the operation control apparatus through an associated base station that the loudspeaker mode has been set (step 300). Next, the control unit 50 stops the operation of the codec unit 44, baseband unit 45, and radio unit 46, and switches the loop-back switch 48 on to connect the input amplifier 61 to output unit 62 in the audio unit 43 (step 302). Then, the control unit 50 controls the audio unit 43 through the signal line 77 to increase the gain of the output amplifier 62 of the audio unit 43 (step 304). As a result, when the user sets the loudspeaker mode in the mobile station, a speech signal inputted to the microphone unit 41 is applied to the output amplifier 62 through the input amplifier 61 and switch 48, amplified by the output amplifier 62, and then outputted to the speaker unit 42. In this way, the speaker unit 42 outputs a speech which is enhanced to a level higher than a normal output level. Subsequently, upon determining the end of the loudspeaker mode (step 306), the control unit 50 returns the display and a variety of settings on the mobile station to normal settings (step 308).

Referring next to FIG. 7B, the operation control apparatus 24 is monitoring a call state of each mobile station (step 310), and upon receipt of a setting to the loudspeaker mode (mode switching information), notifies a predetermined destination mobile station that the loudspeaker mode has been set (the mode switching information has been received) (step 312). Also, the operation control apparatus 24 sets a state flag, associated with the loudspeaker mode of the mobile station, in a ROM of the operation control apparatus 24 to, for example, "1." Upon detection of the end of the loudspeaker mode for the mobile station, the operation control apparatus 24 sets the state flag to, for example, "0," to release the setting of the loudspeaker mode.

The foregoing description has been made for the loudspeaker mode using the microphone of the microphone unit 41 and the speaker of the speaker unit 42 which are mounted in the mobile station as standard equipment, but the usability of the mobile station serving as a loudspeaker can be improved, for example, by connecting an external microphone to the microphone unit 41 and an external speaker to the speaker unit 42.

Also, for example, when the mobile station is set in the loudspeaker mode, the control unit 50 may control the gain of the output amplifier 62 in the audio unit 43 to provide a volume function for variably adjusting the output level from the speaker unit 42 in response to an operation on a predetermined one of a variety of keys, buttons and the like possessed by the operation/display unit 47 of the mobile station.

As described above, the mobile station comprises the microphone unit 41, speaker unit 42, audio unit 43 including amplifier circuits (input amplifier 61 and output amplifier 62) having an interface function with the microphone unit 41 and speaker unit 42, and switch 48 for looping back an input signal from the microphone unit 41 to the speaker unit 42. Further, the mobile station comprises the mode setting unit 49 for switching between the radio communication operation and the loudspeaker operation. In the loudspeaker mode, the loop-back switch 48 is turned on to increase the gain of the output amplifier 62.

The mobile station of this embodiment is normally set in the radio communication mode (normal mode) in which the mobile station makes a call with a communication apparatus operated by a manager working in the control center or with another mobile station or the like. Upon switching to the loudspeaker mode through operations on the mode setting unit 49, the switch 48 is switched to output an input speech from the microphone unit 41 to the speaker unit 42, so that the input speech from the microphone unit 41 is amplified and audibly outputted from the speaker unit 42. In this embodiment, the audio unit 43 of the mobile station is used as a loudspeaker function making use of the loop-back function which is built in as testing means for the audio unit 43.

Therefore, the mobile station of this embodiment permits the user to utilize the mobile station as a loudspeaker, and can therefore improve the function and usability of the mobile station.

In this embodiment, the loop-back function, which is provided for purposes of circuit diagnosis in a manufacturing factory, is utilized in practical use as well, thereby making it possible to improve the function and usability of the mobile station.

Particularly, in safeharbors in the event of a disaster, fields of construction work, event sites and the like, loudspeakers are required for communicating information to persons concerned other than information communicated through radio media, so that it is effective to integrate both the radio communication function and loudspeaker function in a single apparatus. Also, for example, under noisy environments such as in an airport, the mobile station is effectively used as a loudspeaker to guide passengers in an emergency. Also, the mobile station having the loudspeaker function is effectively applied when safety and/or urgency is required.

In the mobile station of the foregoing embodiment, speech input unit is implemented by the function of the microphone unit 41; speech output unit is implemented by the function of the speaker unit 42; output speech signal amplifying unit is implemented by the function of the output amplifier 62; radio transmission processing unit and radio reception processing unit are implemented by the functions of the audio unit 43, codec unit 44, baseband unit 45, and radio unit 46; mode switching instruction accepting unit is implemented by the function of the mode setting unit 49; signal path switching unit is implemented by the functions of the control unit 50 and switch 48; and output amplifier gain increase instructing unit is implemented by the function of control unit 50 and the signal line 77.

Next, a description will be made of a third embodiment of the present invention.

Figure 3A:
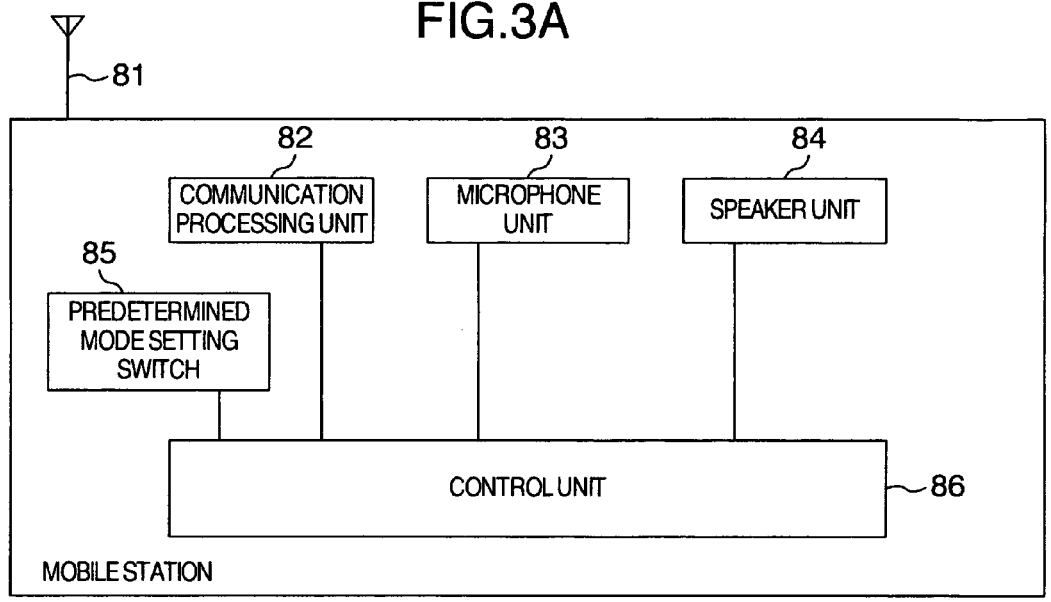
FIG. 3A is a block diagram illustrating an exemplary configuration of a mobile station according to a further embodiment of the present invention.

FIG. 3A generally illustrates an exemplary configuration of a mobile station (for example, the mobile station 1, 2 shown in FIG. 1) according to the third embodiment.

This mobile station comprises an antenna 81, a communication processing unit 82, a microphone unit 83, a speaker unit 84, a particular mode setting switch 85, and a control unit 86.

The communication processing unit 82 has a function of transmitting and receiving signals over the air using the antenna 81.

The microphone unit 83 has a function of receiving a speech, while the speaker unit 84 has a function of outputting a speech.

The mode setting switch 85 comprises, for example, a switch operated by the user of the mobile station, and can specify a desired mode from a plurality of modes through the user's operation, and outputs information indicative of the specified mode to the control unit 86.

Here, in this embodiment, the mode setting switch 85 can set, through an operation thereon, a normal mode (normal communication mode for performing normal radio communication operations); a loudspeaker mode for performing operations as a loudspeaker; and a hot mic mode for performing operations as a hot mic. The normal mode and loudspeaker mode may be, for example, similar to those described in the aforementioned second embodiment.

By way of example, the mode setting switch 85 may sequentially switch the normal mode, loudspeaker mode, and hot mic mode in order (the order is arbitrary) each time the user operates the mode setting switch 85, or may have switches dedicated to the individual modes such that a depression on a particular switch results in switching to a corresponding mode. As an example, when a dedicated switch is provided for the hot mic mode, a depression on this switch results in switching to the hot mic mode.

The control unit 86 has functions of performing a variety of processing and controls, and, for example, is responsive to mode information inputted from the mode setting switch 85 to switch to a mode indicated by the mode information. Also, when a mode is specified from the operation control apparatus side, the control unit 86 responsively switches to the specified mode.

Figure 8:
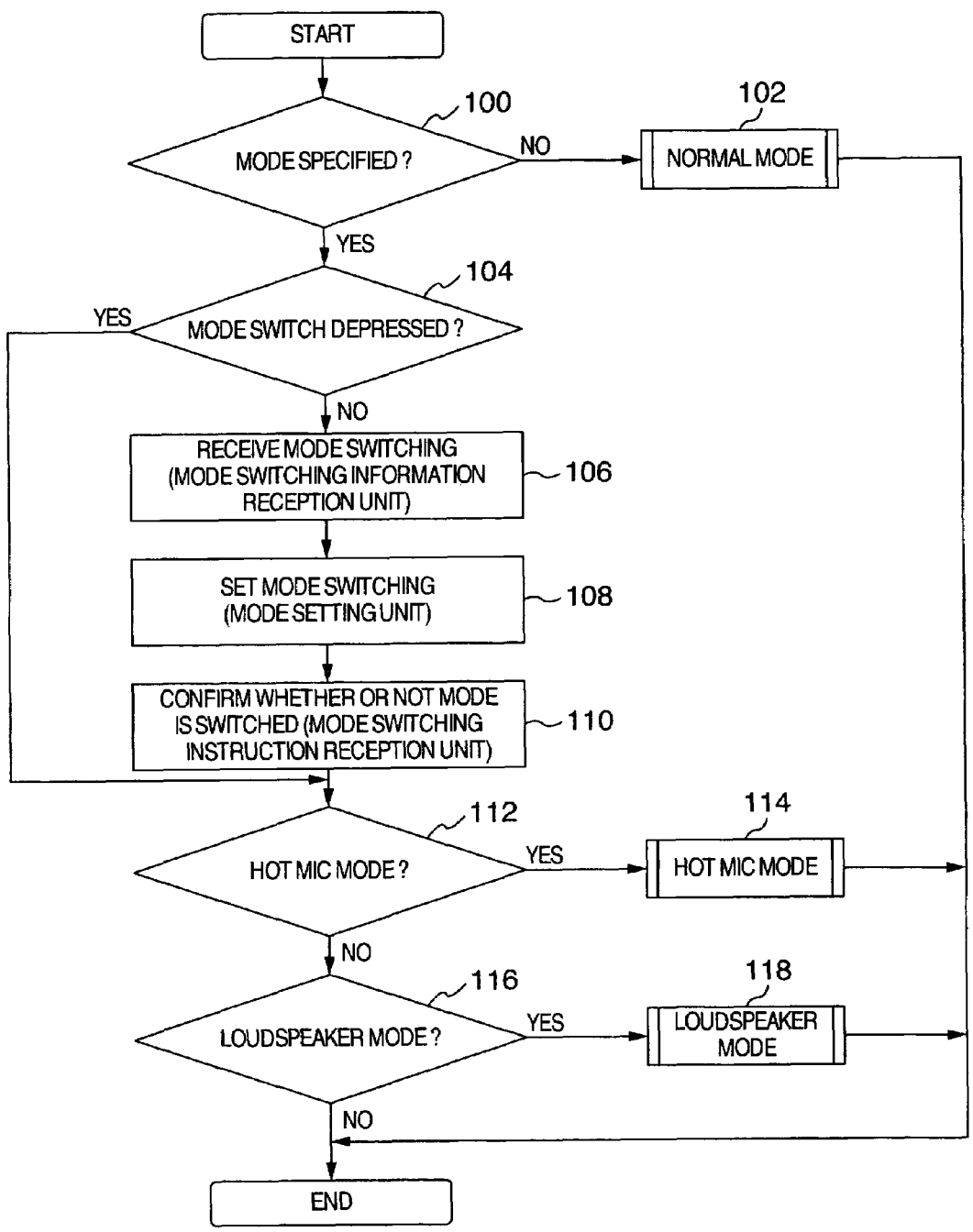
FIG. 8 is a flow chart for describing a sequence of operations performed by the mobile station when the mode is switched.

FIG. 8 illustrates a flow chart which represents a sequence of operations performed by the control unit 86 of the mobile station according to this embodiment. Referring to FIG. 8, a description will be given of a mode determination/setting operation in the mobile station.

First, the control unit 86 determines whether or not a mode is specified (step 100). When no mode is specified, the control unit 86 assumes that the mobile station should be set in the normal mode, and starts the normal mode to make normal radio communications (step 102). When any mode is specified, the control unit 86 determines whether or not the mode setting switch 85 has been depressed (step 104). If the mode setting switch 85 has been depressed, the control unit 86 determines whether or not the hot mic mode has been set (step 112). When YES, the mobile station enters the hot mic mode (step 114). When NO, the mobile station enters the loudspeaker mode (step 116). On the other hand, when the control unit 86 determines at step 104 that the mode setting switch 85 has not been depressed, a mode switching information receiver of the control unit 86 receives mode switching information transmitted from a communication apparatus (for example, the operation control apparatus 24) on the control side through an associated base station (step 106). Next, the mode indicated by the received mode switching information is set in a mode setting unit of the control unit 86 (step 108). The mode switching instruction receiver of the control unit 86 accesses the mode setting unit to check whether or not the mode has been switched (step 110). When the control unit 86 determines that the set mode is the hot mic mode (step 112), the mobile station enters the hot mic mode (step 114). On the other hand, when determining the loudspeaker mode (step 116), the mobile station enters the loudspeaker mode (step 118).

Next, the hot mic mode will be described with reference to FIGS. 8, 9A, 9B, 3A, 3B. Since the normal radio communication mode (step 112) is similar to a general mobile telephone terminal, no description thereon will be required.

The mobile station of this embodiment comprises, for example, a dedicated button switch for starting the hot mic mode in the mode setting switch 85. As the button switch is depressed, the mobile station enters the hot mic mode (step 114) under the control of the control unit 86, as described above, to continuously connect to another predetermined communication apparatus through an associated base station, to maintain the microphone unit 83 to receive a speech input. In this way, the microphone unit 83 collects ambient sound and continuously transmits the collected sound to the other predetermined communication apparatus. In this embodiment, for example, information for identifying the other predetermined communication apparatus is set in the base station or an apparatus on the control side or the like, so that a communication partner, which is to be continuously connected to the mobile station is determined based on this information.

Therefore, the mobile station can transmit sound inputted from the microphone of the microphone unit 83 to a predetermined destination at all times in the hot mic mode, thus improving the function and usability of the mobile station.

Particularly, in the event of a disaster or emergency in an airport, since information must be communicated to other persons at all times, it is effective to implement both the radio communication function and hot mic function in a single apparatus. Also, the mobile station is effectively applied when safety and/or urgency is required.

Next, a description will be given of a mode switching notification made by the mobile station of this embodiment.

When the loudspeaker mode is set by the mode setting switch 85, the mobile station notifies the base station (for example, the base station 11 or 12 shown in FIG. 1) or a communication apparatus on the control side (for example, the operation control apparatus 24 shown in FIG. 1) through the base station that the hot mic mode has been set.

Also, when the hot mic mode is set by the particular mode setting switch 85, the mobile station notifies the base station (for example, the base station 11 or 12 shown in FIG. 1) or a communication apparatus on the control side (for example, the operation control apparatus 24 shown in FIG. 1) through the base station that the hot mic mode has been set.

Upon receipt of the notification of the setting of the predetermined mode (mode switching information), the base station or communication apparatus on the control apparatus side notifies the predetermined destination mobile station of the received notification of the set predetermined mode.

The destination communication apparatus which is to be continuously connected to the mobile station which has been set in the hot mic mode may be the same as or different from the communication apparatus which is notified that the hot mic mode has been set. Also, when there are a plurality of destination communication apparatuses which are to be continuously connected, the communication apparatus which is notified that the hot mic mode has been set may be common to part of the destination communication apparatuses or may be completely different from the destination communication apparatuses.

Figure 3B:
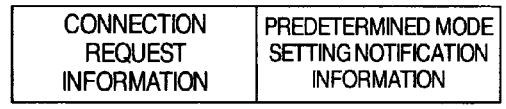
FIG. 3B is a diagram showing an example of information included in a transmission radio signal.

FIG. 3B shows an exemplary signal transmitted to the base station over the air when a predetermined mode (i.e., the loudspeaker mode or hot mic mode) has been set on the mobile station.

This signal includes connection request information for requesting a connection for a communication, and predetermined mode setting notification information for notifying that a predetermined mode has been set.

In this embodiment, the predetermined mode setting notification information may be, for example, information for notifying that the loudspeaker mode has been set, and information for notifying that the hot mic mode has been set, or information for notifying that either the loudspeaker mode or hot mic mode has been set without distinguishing one from the other. The foregoing information comprises mode switching information.

Next, a description will be made on a specific example of a process performed by the mobile station for switching to a predetermined mode.

In this example, the predetermined mode includes the loudspeaker mode and hot mic mode which are different from the normal radio communication mode.

In this example, the base station and an apparatus on the control side (for example, the operation control apparatus 24 shown in FIG. 1) manage and control information for identifying a partner communication apparatus which is notified that a predetermined mode has been set in the mobile station (predetermined mode setting notification information), and information for identifying a partner communication apparatus which is to be continuously connected to the mobile station in the hot mic mode.

As an example, when the mobile station is set in a predetermined mode, the mobile station transmits information (predetermined mode setting notification information) indicating that the predetermined mode has been set to the base station over the air. Then, the predetermined mode setting notification information is notified to a communication apparatus installed in the control center through the base station, so that the communication apparatus in the control center is aware that the predetermined mode has been set. Also, the predetermined mode setting notification information is visually or audibly outputted by the communication apparatus and/or an informing apparatus in the control center to let the manger know the fact that the mobile station has been set in the predetermined mode.

Also, as an example, when the predetermined mode is the hot mic mode, and the base station or the communication apparatus in the control center is notified that the hot mic mode has been set in the mobile station of this embodiment, the base station or the communication apparatus in the control center controls based on the information for identifying a partner (another predetermined communication apparatus) which is to be continuously connected to the mobile station to continuously connect the mobile station of this embodiment to the other predetermined communication apparatus.

Referring to a flow chart of FIG. 9A, a description will be given of an exemplary sequence of operations performed by the mobile station when the hot mic mode has been set therein.

Figure 9A:
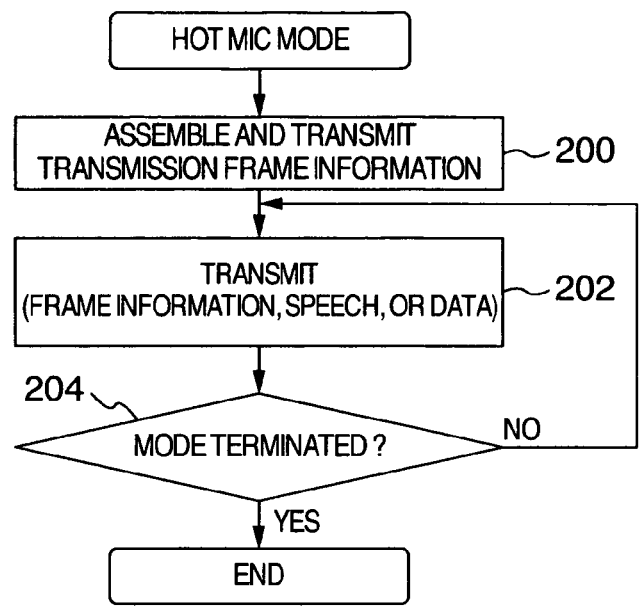
FIG. 9A is a flow chart for describing a sequence of operations performed by the mobile station in a hot mic mode according to another embodiment.

In FIG. 9A, as the hot mic mode is set, the mobile station assembles transmission frame information including the aforementioned connection request information and hot mic mode setting notification information (i.e., mode switching information), and transmits this transmission frame information to the base station or the communication apparatus or the like in the control center through the base station (step 200). Next, the mobile station forms a speech or data to be transmitted into a predetermined transmission frame for transmission to the base station (step 202). Upon termination of the transmission, the hot mic mode is terminated (step 204).

The transmission frame information assembled at step 200 includes:

(1) connection request information (request for a call, urgency, source ID, and the like);

(2) hot mic mode setting notification information (i.e., mode switching information); and (3) type of data (speech/image).

As described above, in this embodiment, the information on the destination in the hot mic mode (information which includes the destination ID and the like and identifies the partner communication apparatus which is to be continuously connected to the mobile station in the hot mic mode) is managed by the base station, the apparatus on the control side (for example, the operation control apparatus 24 shown in FIG. 1), or the like. Also, the destination information in a predetermined mode can be set and changed by the operator as required on the operation control apparatus 24 (FIG. 1).

Figure 9B:
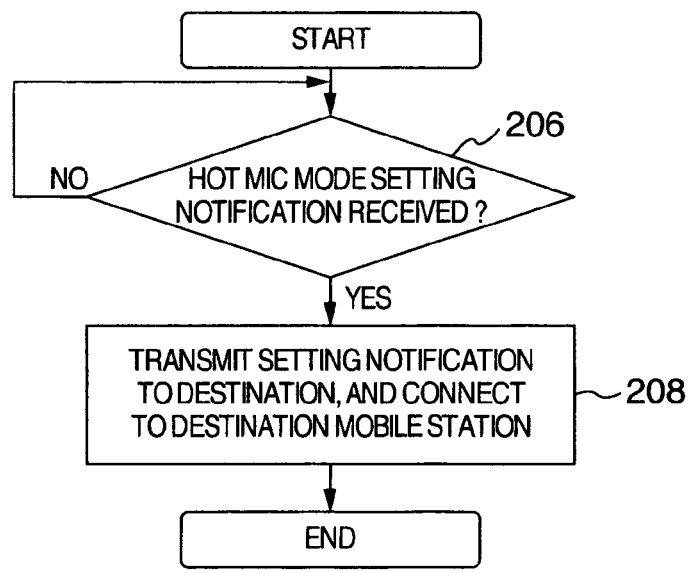
FIG. 9B is a flow chart for describing a sequence of operations performed by the control side in the hot mic mode.

Referring to FIG. 9B, a description will be given of a sequence of operations performed by a communication apparatus on the control side or the base station when the hot mic mode has been set.

In FIG. 9B, the operation control apparatus 24 is monitoring each mobile station for a call state (step 206), and upon receipt of hot mic mode setting notification information (mode switching information), the operation control apparatus 24 notifies a predetermined destination mobile station that the hot mic mode has been set (mode switching information has been received) (step 208), and sets a state flag associated with the hot mic mode of the mobile station in a RAM of the operation control apparatus 24, for example, to "1." The control side apparatus further indicates a connection with a predetermined destination mobile station held in the operation control apparatus 24 to an associated base station. Upon detection of the end of the hot mic mode in the mobile station, the operation control apparatus 24 sets the state flag, for example, to "0" to release the setting of the hot mic mode.

Also, as an example, in a place where a large number of persons flock, in response to a predetermined mode set to a mobile station carried by a person, this setting is informed through an audio output, a display on the screen, a lighting lamp, or the like to all or part of other mobile stations which exist in a region which is placed in a predetermined relationship with the location at which the mobile station is situated. The predetermined region may be the same sector as the sector in which the mobile station has been set in the predetermined mode, one or a plurality of surrounding sectors adjacent to the sector in which the mobile station has been set in the predetermined mode, a coverage area (service area) of a base station which accommodates the mobile station that has been set in the predetermined mode, a coverage area (service area) of a neighboring base station adjacent to the base station which accommodates the mobile station that has been set in the predetermined mode, and the like. The proximity can be determined, for example, by previously setting information for identifying which base station is located nearby, or by comparing acquired information on the location of a base station with a threshold distance which defines the proximity. In the former case, a neighboring base station may be identified, for example, from map information held by the operation control apparatus 24 and the location of each mobile station acquired utilizing GPS.

Also, as an example, when no predetermined mode has not been set in any mobile station at a predetermined place, a plurality of mobile stations may be managed in units of previously set groups to make communications. On the other hand, when a predetermined mode has been set in any mobile station, a plurality of mobile stations may be managed according to previously set areas to make communications.

Also, as an example, information for notifying that a predetermined mode has been set may be communicated using a paging channel (PCH), a paging control channel (PCCH), or the like.

Here, a variety of forms can be used to implement a partner which is to be continuously connected in the hot mic mode.

For example, a mobile station set in the hot mic mode may be continuously connected to a communication apparatus (for example, the operation control apparatus 24) in the control center, such that sound collected by the mobile station is continuously received by the communication apparatus in the control center and outputted from a speaker, thus permitting a manager and the like to hear the sound. This can be accomplished, for example, by setting information for identifying the communication apparatus in the control center in the mobile station or base station or the operation control apparatus 24, as information for identifying a partner which is to be continuously connected to the mobile station.

Alternatively, for example, a plurality of mobile stations may be divided into several groups, and information for identifying mobile stations included in each group may be stored in each mobile station. In this way, a mobile station set in the hot mic mode can be continuously connected to another mobile station included in a predetermined group. This can be accomplished, for example, by setting information for identifying the predetermined group and information for identifying mobile stations included in the predetermined group in the mobile station or base station or operation control apparatus 24 as information for identifying a partner which is to be continuously connected. Referring to FIG. 10, a description will be given of a specific example of dividing a plurality of mobile stations into several groups.

In FIG. 10, a plurality of Airline Companies A, B, C and so on are accommodated in one airport, and have company ID's, for example, 00-, 01-, 02- and the like, respectively. Pilots, flight attendants, ground crews, clerks and the like belong to each Airline Company. For example, a cockpit crew of Airline Company A carries a mobile station assigned an ID "00-111-2345"; flight attendants carry mobile stations assigned ID's "00-112-XXXX"; and ground crews have mobile stations assigned ID's "00-113-XXXX." A cockpit crew of Airline Company B carries a mobile station assigned ID "01-111-2345"; and ground crews carry mobile stations assigned ID's "01-112-XXXX." Airline Company C is similar in that its cockpit crew, flight attendants, and ground crews carry mobile stations assigned ID's in accordance with a similar numbering rule. These mobile stations belonging to Airline Companies A, B, C can be grouped according to Airline Company using the ID's of Airline Company, or according to occupations using the ID's of the occupations across Airline Companies A, B, C. A row surrounded by a broken line in FIG. 10 shows exemplary grouping according to the flight attendant. Such grouping can be previously set in the mobile stations, base station, or operation control apparatus 24. Alternatively, the mobile stations can be regrouped as required in the operation control apparatus 24 on the control side.

Also, for example, a mobile station set in the hot mic mode can be continuously connected to all or part of other mobile stations accommodated by a base station which accommodates the mobile stations in its coverage area (service area). In this event, for example, information for identifying the mobile stations accommodated by the base station can be used to identify a partner which is to be continuously connected to the mobile station. Alternatively, sound information from the mobile station set in the hot mic mode may be transmitted through an informing signal or the like for all the mobile stations accommodated by the base station. This configuration will be described with reference to FIG. 11. FIG. 11 schematically illustrates an exemplary airport.

In FIG. 11, the air port includes a first terminal building, a second terminal building, a runway, and a control tower. A base station A has a service area which covers, for example, the control tower, first terminal building, and part of the runway. A plurality of parties associated with the airport are present on each of floors in the first terminal building, and carry their own mobile stations. An arbitrary mobile station in the first terminal building can be continuously connected to all or part of mobile stations in the same terminal building. The same applies to the second terminal building which is covered by a service area of a base station B.

Also, for example, a mobile station set in the hot mic mode can be continuously connected to all or part of other mobile stations accommodated by a base station which accommodates the mobile station set in the hot mic mode in its coverage area and by base stations installed near the mobile station. In this event, the proximity can be determined, for example, by previously setting information for identifying which base station is located nearby, or by comparing acquired information on the location of a base station with a threshold distance which defines the proximity. For example, in FIG. 11, an arbitrary mobile station in the first terminal building can be continuously connected to all or part of mobile stations in the second terminal building which is located near the first terminal building.

In the mobile station of this example, a speech input unit is implemented by the function of the microphone unit 83; a radio communication processing unit is implemented by the function of the communication processing unit 82; a mode switching instruction receiving unit is implemented by the function of the predetermined mode setting switch 85; and a hot mic operating unit is implemented by the functions of the control unit 86, microphone unit 83, communication processing unit 82, and antenna 81.

Also, in the mobile station of this example, a predetermined mode switching information transmission unit is implemented by the functions of the control unit 86, communication processing unit 82, and antenna 81.

Also, in the radio communication system, a mode switching notification unit is implemented by a base station, a communication apparatus on the control side, or the like. Also, in the mode switching notification apparatus, a mode switching information reception unit is implemented by a function of receiving information which indicates that an instruction for switching to a predetermined mode has been transmitted from a mobile station, and a particular mode switching information transmission unit is implemented by a function of transmitting predetermined information to other mobile stations and the like upon receipt of the information.

Next, a description will be given of a fourth embodiment of the present invention.

In this embodiment, a plurality of monitor camera units (for example, the monitor camera units 31 shown in FIG. 1) are installed at predetermined locations in an airport or the like for capturing images, and data on the captured images is transmitted from the plurality of monitor camera units to a communication apparatus (for example, the operation control apparatus 24 shown in FIG. 1) in the control center. The communication apparatus installed in the control center, or a processing apparatus connected thereto comprises a screen for displaying the image information, such that part or all of one or more pieces of image information received from the plurality of monitor camera units is displayed on the screen. A manager or the like, who is present in the control center, can view image information displayed on the screen to monitor a variety of regions in a predetermined site such as an airport.

Then, in this embodiment, when any of mobile stations present in a predetermined site such as an airport is set in a predetermined mode (for example, the loudspeaker mode or hot mic mode), and the communication apparatus in the control center is notified of the mobile station set in the predetermined mode, the communication apparatus in the control center or the processing apparatus connected thereto identifies image information received from a monitor camera unit which is capturing a region in which the mobile station set in the predetermined mode is found. When the identified image information is not displayed on the screen, the communication apparatus controls the monitor camera units to display the image information on the screen. Also, for example, when the screen is split into a plurality of areas to display image information from two or more monitor camera units on the single screen, the user is notified of which is the identified image information with a mark, light, sound, or the like.

Figure 4:
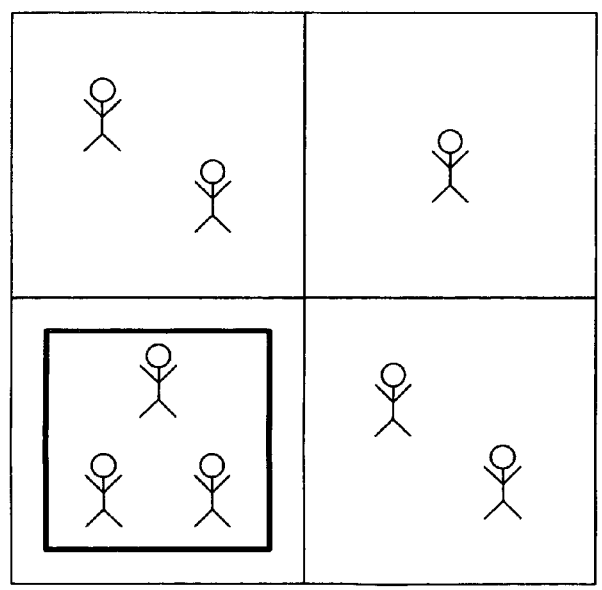
FIG. 4 is a diagram illustrating an exemplary image displayed on a screen in a management center according to a further embodiment of the present invention.

FIG. 4 illustrates exemplary image information displayed on the screen of the communication apparatus in the control center or the processing apparatus connected thereto, where one screen is split into four areas to display image information captured by four monitor camera units on the single screen.

In the example illustrated in FIG. 4, a square frame mark is superimposed on the lower left image information of the four image information areas, thus indicating that the lower left image information superimposed with the frame mark represents a region in which the mobile station set in the predetermined mode should be found.

Here, for identifying the monitor camera unit which is capturing the region in which the mobile station set in the predetermined mode is found, for example, the monitor camera units may be previously corresponded to nearby base stations for management, such that the monitor camera unit can be identified from a base station (for example, the base station 11 or 12 shown in FIG. 1) which accommodates the mobile station in its coverage area (service area).

In the radio communication system of this embodiment, a plurality of imaging apparatus are implemented by a plurality of monitor camera units (for example, the monitor camera units 31 shown in FIG. 1), and an image display apparatus is implemented by the communication apparatus on the control side and the like.

Also, in the image display apparatus, an image display signal output unit is implemented by a function of outputting an image signal for displaying a captured image on the screen; a mode switching information reception unit is implemented by a function of receiving information transmitted from the mobile station for indicating that it has been instructed to switch to a predetermined mode; an imaging apparatus identification unit is implemented by a function of identifying an associated monitor camera unit when the information is received; and an image display control unit is implemented by a function of displaying an image from the identified monitor camera unit in a special form (i.e., a form which permits the user to distinguish the image from those from other monitor camera units).

Next, a description will be given of a fifth embodiment of the present invention.

FIG. 5A generally illustrates the configuration of a mobile station (for example, the mobile station 1 or 2 shown in FIG. 1) according to the fifth embodiment.

The illustrated mobile station comprises, for example, an antenna 81, a communication processing unit 82, a microphone unit 83, a speaker unit 84, a predetermined mode setting switch 85, and a control unit 86, which make up a processing unit that has similar functions to those provided in the mobile station illustrated in FIG. 3A. The mobile station further comprises a predetermined mode destination memory 91.

In order to identify a communication apparatus which becomes a destination communication apparatus to be communicated when a predetermined mode is set in the mobile station, the predetermined mode destination memory 91 stores one or both of information for identifying a communication apparatus which is to be notified that the mobile station has been set in a predetermined mode (for example, the loudspeaker mode or hot mic mode) at the time the setting has been made, and information for identifying a partner communication apparatus which is to be continuously connected when the mobile station has been set in the hot mic mode. Since a procedure from the issuance of a mode specifying instruction from the mode setting switch 85 of the mobile station or from a control apparatus to a transition of the mobile station to the specified mode is the same as that described in connection with the embodiment of FIGS. 3A, 3B with reference to FIG. 8, repeated description is omitted.

FIG. 5B shows an exemplary signal which is transmitted over the air to a base station (for example, the base station 11 or 12 shown in FIG. 1) when the mobile station has been set in a predetermined mode.

This signal includes connection request information for requesting for establishment of a connection for a communication; predetermined mode destination information for identifying a communication apparatus which is notified when the predetermined mode has been set; and predetermined mode setting notification information for notifying that the predetermined mode has been set.

For example, when the predetermined mode destination information includes information for identifying a communication apparatus which is notified that the mobile station has been set in a predetermined mode (for example, the loudspeaker mode or hot mic mode) when the setting has been made, a base station or a line controller (for example, the line controller 14 shown in FIG. 1) or the like notifies the destination identified by that information that the mobile station has been set in the predetermined mode.

Also, when the predetermined mode destination information includes, for example, information for identifying a communication apparatus which serves as a partner that is to be continuously connected to the mobile station when it is set in the hot mic mode, the base station or line controller (for example, the line controller 14 shown in FIG. 1) or the like continuously connects the communication partner identified by that information to the mobile station which has been set in the predetermined mode.

Referring to a flow chart of FIG. 12, a description will be given of an exemplary sequence of operations performed by the mobile station when it has been set in the hot mic mode.

In FIG. 12, as the mobile station is set in the hot mic mode, destination information in the hot mic mode is entered through the operation/display unit 47, and stored in the predetermined mode destination memory 91. The destination information includes the individual ID (ID's) of an destination communication device (devices) or the group ID of a group of transmission destination. When the destination information has been previously stored in the predetermined mode destination memory 91, the information is retrieved from the memory 91 (step 400).

Next, transmission frame information is assembled including the aforementioned connection request information and hot mic mode setting notification information, and this transmission frame information is transmitted to the base station or to a communication apparatus (for example, the operation control apparatus 24) in the control center or the like through the base station (step 402). Next, a speech or data to be transmitted is formed into a predetermined transmission frame which is transmitted to the base station (step 202). Upon completion of the transmission, the hot mic mode is terminated (step 204).

The transmission frame information includes:

(1) connection request information (call request, urgency, source ID, and the like);

(2) particular mode destination information (destination ID or the like);

(3) particular mode setting notification information ("hot mic"); and (4) type of data (speech/image).

While the operation on the control side is basically the same as the sequence described with reference to FIG. 9B, this embodiment differs from the sequence illustrated in FIG. 9B in that information on a mobile station which is notified and a mobile station which is to be connected is received from the mobile station which has been set in the hot mic mode. Also, when the predetermined mode set in the mobile station is the loudspeaker mode, a sequence of operations involved in this event is the same as that described in connection with the embodiment of FIGS. 3A, 3B, so that repeated description will not be needed.

In the mobile station of the fifth embodiment, a mode switching instruction reception unit is implemented by the function of the mode setting switch 85; a destination identifying information storage unit is implemented by the function of the predetermined mode destination memory 91; and a particular mode destination identifying information transmission unit is implemented by the functions of the control unit 86, communication processing unit 82, and antenna 81.

The destination information in the hot mic mode (including a destination ID and the like, and used to identify a communication apparatus which serves as a partner that is to be continuously connected to the mobile station when it is set in the hot mic mode) can be freely re-set by the operator in the control center as required through a control side apparatus (for example, the operation control apparatus 24 shown in FIG. 1) to extend a communication range. A six embodiment enables this feature.

The six embodiment enables an additional setting of, for example, a particular mobile station or a particular destination group as a connection partner (partners) as required, i.e., regrouping, as determined by the operator in the control center, in addition to a communication apparatus which has been set as a partner that is to be continuously connected to a mobile station which has been set in the hot mic mode, in the mobile station or a base station or a communication apparatus (for example, the operation control apparatus 24) on the control side. This embodiment will be described with reference to FIG. 13A.

Figure 13A:
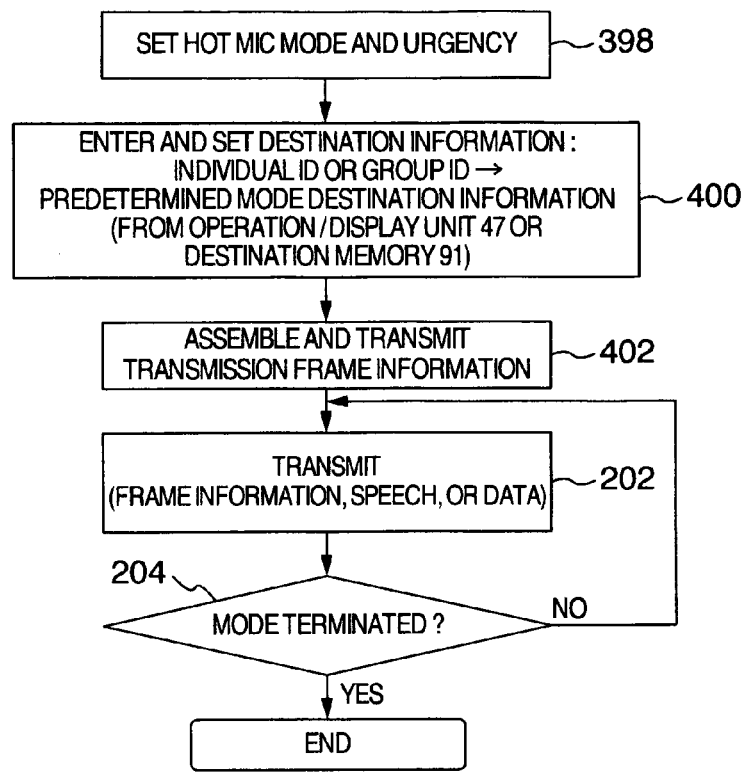
FIG. 13A is a flow chart for describing a sequence of operations performed by the mobile station in the hot mic mode according to a further embodiment.

In FIG. 13A, the operator sets the hot mic mode as well as a communication urgency in the mobile station (step 398). As the hot mic mode is initiated, the destination information is retrieved from the predetermined mode destination memory 91 or entered by the operator from the operation/display unit 47 (step 400). Next, transmission frame information is generated and transmitted to the base station (step 402). While the transmission frame information comprises information similar to that shown in FIG. 2, the urgency included in the connection request information was set by the operator of the mobile station when the hot mice mode was set.

Figure 13B:
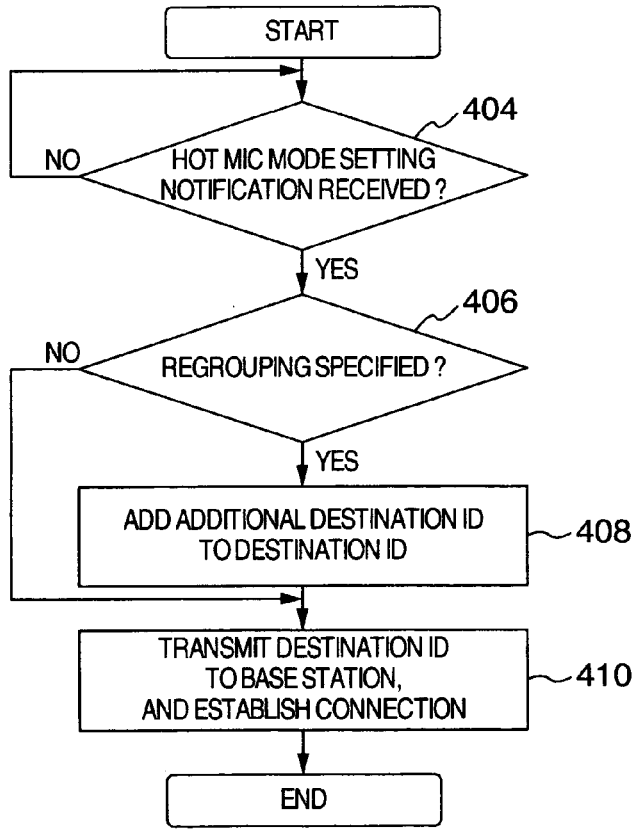
FIG. 13B is a flow chart for describing a sequence of operations performed by the control side in the hot mic mode.

Referring to FIG. 13B, a description will be given of a sequence of operations performed on a control apparatus side.

An apparatus on the control side (for example, the operation control apparatus 24) is monitoring whether a hot mic mode setting notification is received (step 404). Upon receipt of this information, the operator in the control center determines whether or not a communication range need be expanded (additional destination is set) in consideration of the connection request information and predetermined destination information received by the base station, and specifies regrouping when the communication range need be expanded, and sets the ID(s) of one or a plurality of groups which should be additionally connected, in a RAM of the operation control apparatus 24. This setting may be performed on a screen, not shown, of the operation control apparatus 24, or dedicated input buttons may be previously provided on the operation control apparatus 24 for specifying each of groups, or any arbitrary method may be used. Further, when the mobile communication system has a GPS function, a mobile station near the mobile station set in the hot mic mode may be identified from the position of the mobile station set in the hot mic mode and map information stored in the memory of the operation control apparatus 24, and the identified mobile station may also be connected to the mobile station in the hot mic mode. The operation control apparatus 24 is monitoring whether or not the regrouping is specified (step 406). When the regrouping is specified, the operation control apparatus 24 adds the additional (group) ID to a destination ID or a destination group ID received from the base station (step 408), transmits these destination ID's to an associated base station to establish a radio connection between the base station and destination mobile stations (step 410). Then, the associated base station transmits transmission data received from the mobile station which has been set in the hot mic mode, to the destination mobile station(s).

Figure 14:
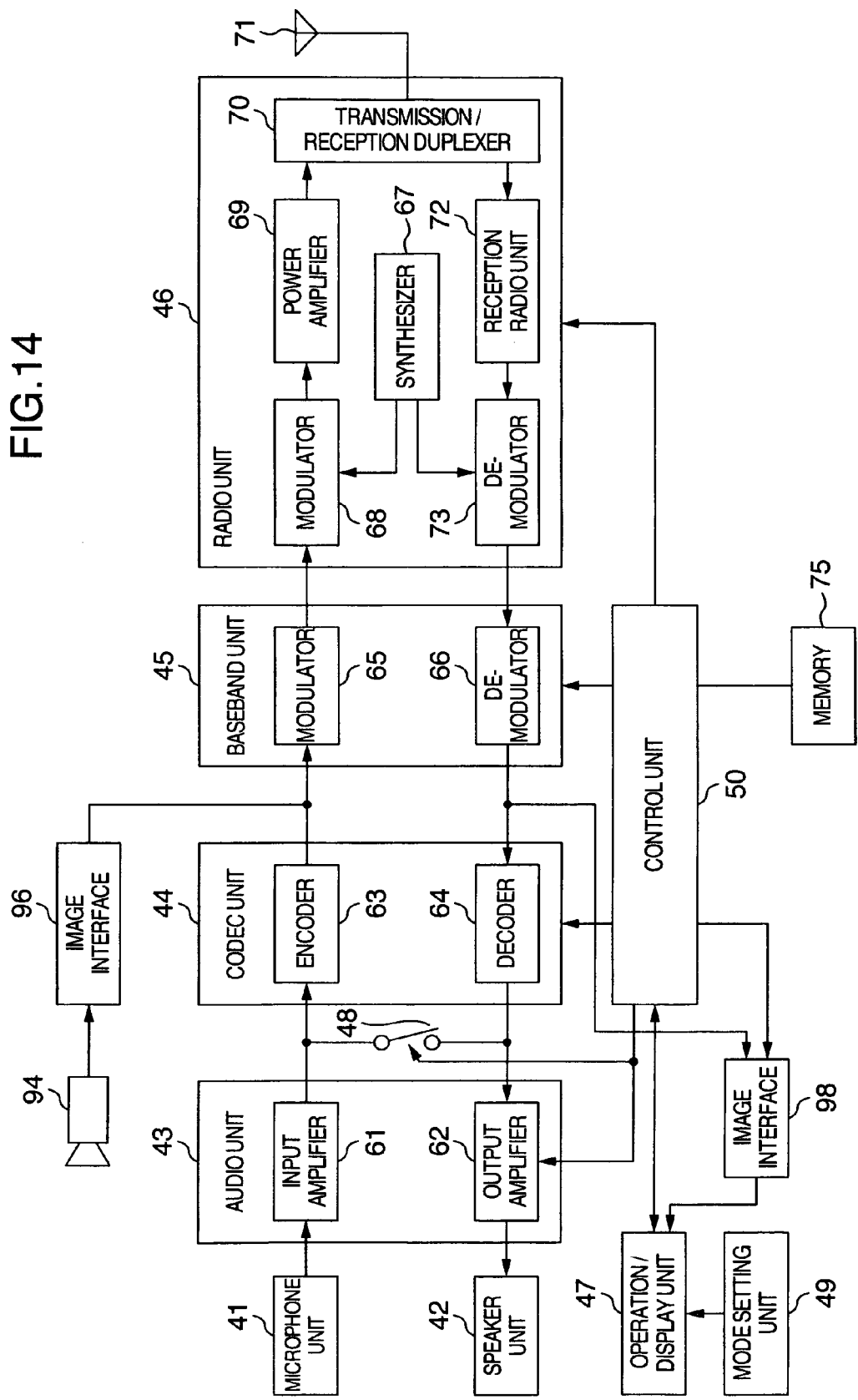
FIG. 14 is a block diagram illustrating a mobile station according to a further embodiment of the present invention.

Next, a seventh embodiment of the present invention will be described with reference to FIG. 14. FIG. 14 illustrates the configuration of a mobile station having a monitor camera function according to the seventh embodiment.

The mobile station of the seventh embodiment adds an image interface (image data input unit) 96 and an image decoder 98 to the mobile station illustrated in FIG. 2 to have a function of capturing, transmitting, and displaying images.

Specifically, since the mobile station of the embodiment illustrated in FIG. 2 has the hot mic function, the seventh embodiment utilizes this hot mic function to operate as a real-time monitor camera (live camera) in the hot mic mode, for example, by connecting an image collection device 94 such as a camera comprising an image encoder to the image interface 96 of the mobile station.

More specifically, the hot mic function of the mobile station illustrated in FIG. 2 continues to transmit speeches inputted (collected) by the microphone to a communication partner, for example, the operation control apparatus 24 which is continuously connected to the mobile station in the hot mic mode. The mobile station of the seventh embodiment utilizes the continuously transmitting function in the hot mic mode to continue to transmit image data captured by an image collecting device such as a camera connected to the image interface 96 from the mobile station to a communication partner, thus acting as a live camera.

In this way, the mobile station of this embodiment can apply the hot mic function to a live camera, thereby improving the usability of the mobile station.

In the mobile station of this embodiment, speech input unit is implemented by the function of the microphone; the image collecting apparatus is implemented by an external camera or the like; an external image collecting apparatus connector is implemented by a function of interfacing with an external camera or the like; an image data input unit is implemented by a function of inputting image data from an external camera or the like; a radio communication processing unit is implemented by a function of communicating over the air using the antenna; a mode switching instruction reception unit is implemented by a function of receiving an instruction for switching to the hot mic mode; and a hot mic operation unit is implemented by a function of continuing to transmit speech and image data to a communication partner at all times when the hot mic mode is set.

Here, the radio communication system, mobile station and the like according to the present invention are not necessarily limited in configuration to those shown above, but may be implemented in a variety of configurations. Also, the present invention can provide a method or a technique for executing the processing according to the present invention, a program for implementing the foregoing method and technique, and a recording medium which has recorded thereon the program. The method or technique for executing the processing may also be provided in the form of a variety of apparatuses and systems.

Also, the present invention is not necessarily limited to the application to the field described above, but can be applied to a variety of fields. For example, the present invention can also find its applications in local radio systems such as a multichannel access (MCA), public disaster prevention systems of local communities, and the like.

Also, a variety of processing executed in the radio communication system, mobile station and the like according to the present invention may be controlled, for example, by a processor which executes a control program stored in a ROM (Read Only Memory) in a hardware resource comprising the processor, memory and the like. Alternatively, the processing may be implemented, for example, by hardware circuits in which respective functional means execute the associated processing independently of one another.

Further, the present invention can be implemented by a computer readable recording medium such as a floppy (registered trade mark), CD (Compact Disc)-ROM or the like which stores the foregoing control program, or by the program itself. The control program may be loaded into a computer from the recording medium and executed by a processor to carry out the processing according to the present invention.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile station comprising:
a speech input unit for receiving a speech;
an external image collecting apparatus;
an image data input unit for receiving image data from said external image collecting apparatus;
a radio communication processing unit for making a radio communication using an antenna;
a mode switching instruction reception unit for receiving an instruction for switching from a radio communication mode for performing a radio communication operation to a hot mic mode for performing a hot mic operation from said radio communication processing unit; and
a hot mic operation unit responsive to the instruction for switching to the hot mic mode received by said mode switching instruction reception unit for making a connection to another communication apparatus to continuously transmit a speech signal inputted from said speech input unit to said other communication apparatus through said radio communication processing unit, and to continuously transmit image data inputted by said image data input unit to said other communication apparatus through said radio communication processing unit,
wherein said speech input unit includes a first transducer for transducing said speech to a speech signal,
wherein said mobile station further comprises:
a first amplifier for amplifying the speech signal,
a transmission processing unit connected to said radio communication processing unit for processing an output signal from said audio signal amplifier for transmission and transmitting the processed signal from an antenna over the air,
a reception processing unit connected to said communication processing unit for processing a signal received by said antenna for reception,
a second amplifier for amplifying an output signal of said reception processing unit,
a second transducer for transducing an output signal of said second amplifier to an audio output,
wherein said mode switching instruction reception unit being adapted to further receive an instruction for switching from said radio communication mode to a loudspeaker mode for performing a loudspeaker operation utilizing said second transducer,
a signal path switching unit responsive to the received instruction for switching to the loudspeaker mode for switching a signal path such that the speech input to said first transducer is amplified by said first and second amplifiers, and emitted from said second transducer as an audio output, and
a gain increase instruction unit responsive to the received instruction for switching to the loudspeaker mode for increasing the gain of said second amplifier.

* * * * *